(12) United States Patent
Erickson et al.

(10) Patent No.: US 11,759,996 B2
(45) Date of Patent: Sep. 19, 2023

(54) SURFACE FEATURE FORMATION FOR THREE-DIMENSIONAL PRINTING

(71) Applicant: Hewlett-Packard Development Company, L.P., Spring, TX (US)

(72) Inventors: Kristopher J. Erickson, Palo Alto, CA (US); Anthony McLennan, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 61 days.

(21) Appl. No.: 16/978,869

(22) PCT Filed: Apr. 27, 2018

(86) PCT No.: PCT/US2018/030006
§ 371 (c)(1),
(2) Date: Sep. 8, 2020

(87) PCT Pub. No.: WO2019/209343
PCT Pub. Date: Oct. 31, 2019

(65) Prior Publication Data
US 2021/0046700 A1    Feb. 18, 2021

(51) Int. Cl.
*B29C 64/106*    (2017.01)
*B29C 64/264*    (2017.01)
(Continued)

(52) U.S. Cl.
CPC ............ *B29C 64/106* (2017.08); *B22F 1/054* (2022.01); *B22F 10/64* (2021.01); *B22F 12/13* (2021.01); *B22F 12/30* (2021.01); *B29C 64/188* (2017.08); *B29C 64/264* (2017.08); *B22F 10/25* (2021.01); *B22F 10/28* (2021.01); *B22F 10/39* (2021.01);
(Continued)

(58) Field of Classification Search
CPC ..... B29C 64/188; B29C 64/264; B33Y 10/00; B33Y 30/00; B33Y 40/20
See application file for complete search history.

(56) References Cited

U.S. PATENT DOCUMENTS

| 4,238,840 A | 12/1980 | Swainson |
| 4,707,787 A | 11/1987 | Savit et al. |
| 5,145,741 A | 9/1992 | Quick |
| 10,195,666 B1 * | 2/2019 | Barnet ................... B29C 64/10 |

(Continued)

FOREIGN PATENT DOCUMENTS

| DE | 102008055950 | 10/2009 |
| EP | 3202514 | 8/2017 |

(Continued)

*Primary Examiner* — Joseph S Del Sole
*Assistant Examiner* — Xinwen Ye
(74) *Attorney, Agent, or Firm* — SHOOK, HARDY & BACON L.L.P.

(57) ABSTRACT

An example system includes a three-dimensional (3D) printer to generate a 3D object and a surface feature formation arrangement to receive the 3D object. The 3D object has at least one surface with a layer of at least partly uncured material. The surface feature formation arrangement includes a controller and a heat source. The controller is to operate the heat source to selectively apply heat to the at least one surface of the 3D object. The heat from the heat source is to transform the at least partly uncured material to form a selected feature on the at least one surface.

20 Claims, 3 Drawing Sheets

(51) Int. Cl.
*B29C 64/188* (2017.01)
*B22F 12/13* (2021.01)
*B22F 12/30* (2021.01)
*B22F 10/64* (2021.01)
*B22F 1/054* (2022.01)
*B33Y 10/00* (2015.01)
*B33Y 30/00* (2015.01)
*B33Y 40/20* (2020.01)
*B22F 10/25* (2021.01)
*B22F 10/28* (2021.01)
*B22F 10/39* (2021.01)

(52) U.S. Cl.
CPC ............... *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 2016/0067922 A1* | 3/2016 | Voris | B29C 64/40 |
| | | | 264/401 |
| 2016/0147153 A1* | 5/2016 | Hart | G03F 7/2051 |
| | | | 427/508 |
| 2017/0008236 A1* | 1/2017 | Easter | C04B 35/5603 |
| 2017/0046548 A1 | 2/2017 | Kamijo et al. | |
| 2017/0087639 A1* | 3/2017 | Folgar | H01C 7/027 |
| 2017/0136603 A1 | 5/2017 | Ganapathiappan et al. | |
| 2018/0153648 A1* | 6/2018 | Shanjani | B33Y 80/00 |

FOREIGN PATENT DOCUMENTS

| | | |
|---|---|---|
| WO | WO-2017075285 | 5/2017 |
| WO | WO-2017085470 A1 | 5/2017 |

\* cited by examiner

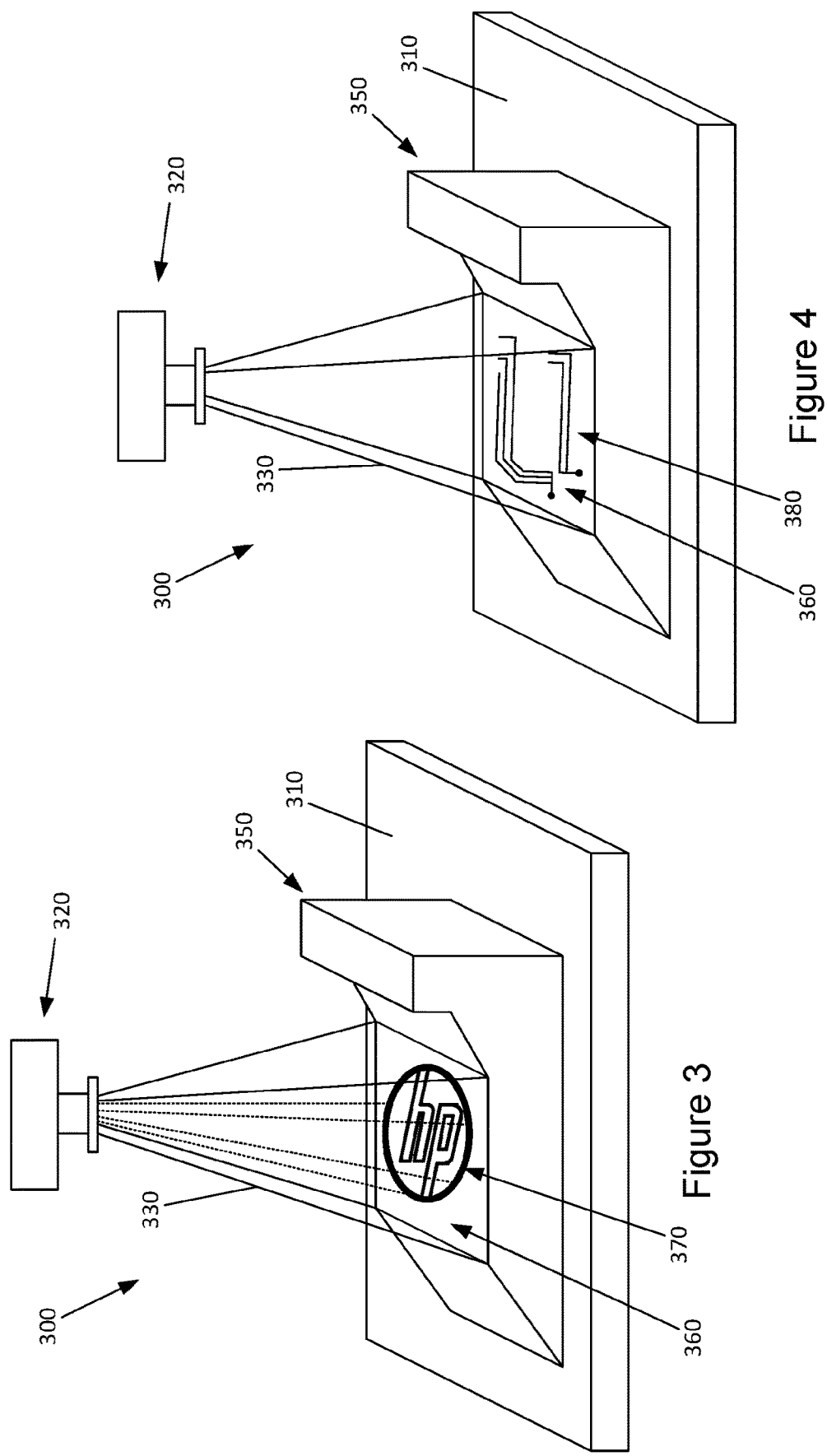

SURFACE FEATURE FORMATION FOR THREE-DIMENSIONAL PRINTING

BACKGROUND

Three-dimensional (3D) printing is becoming ubiquitous in a variety of environments. For example, many manufacturing arrangements regularly utilize 3D printing to manufacture or facilitate the manufacturing of various components. Further, 3D printers are becoming accessible to smaller entities and individuals. Three-dimensional printers typically operate with carriages performing various tasks. For example, one carriage may deposit material in layers, and another carriage may apply energy to selectively fuse the material.

BRIEF DESCRIPTION OF THE DRAWINGS

For a more complete understanding of various examples, reference is now made to the following description taken in connection with the accompanying drawings in which:

FIG. 3 illustrates an example surface feature formation arrangement;

FIG. 4 illustrates another example surface feature formation arrangement;

DETAILED DESCRIPTION

As noted above, 3D printing may produce a 3D printed object by curing, or fusing, a print material, such as powder. A 3D printer generates a 3D printed object. The 3D printer may use any of a variety of 3D printing technologies, such as multi jet fusion (MJF), fused deposition modeling (FDM), or selective laser sintering (SLS). The 3D printing includes fusing or curing of a material (e.g., 3D printing ink or powder).

Identification or tracking of 3D printed objects, as any objects, is facilitated with markings or other features on a surface of the object. For example, a 2-D identifier, such as a QR code, allows the object to be identified and/or tracked. Further, logos or other markings on the object may be desirable, for example, for marketing purposes.

Various examples described herein relate to post-processing in 3D printing. The 3D printed object is formed with at least partly unfused or uncured powder embedded on at least one surface of the object, for example, as a result of the 3D printing process. In various examples, heat from a heat source is applied to the surface to form a desired feature on the surface. In this regard, the heat causes transformation (e.g., melting, evaporating, decomposing, consolidating, sintering, or coalescing) of the embedded material to form, for example, an image. In some examples, the at least partly unfused material is a metal nanoparticle ink. The heat from the heat source causes the metal nanoparticles to sinter and form a conductive trace. In various examples, the heat source may be a light source and can generate light that is ultraviolet, visible or infrared.

Referring now to the Figures, an example system for surface feature formation for 3D printed objects is illustrated. The example system 100 includes a 3D printer 110 to generate a 3D object (not shown in FIG. 1). The 3D printer 110 may employ one of a variety of 3D printing technologies including, but not limited to, MJF, FDM, or SLS. The 3D printer 110 may include various components, such as carriages to distribute build material and to cure (e.g., fuse) the build material. In various examples, the build material may be a powder, such as a polymer powder. In some examples, as described below, the build material may include metal nanoparticles.

The 3D printer 110 may further include a controller to control operation of the various components, such as the aforementioned carriages. The controller may further facilitate communication with an external user device to, for example, receive data or instructions related to the 3D object to be printed.

In various examples, the 3D printing may cause a layer of at least partly uncured build material embedded on a surface of the 3D printed object. For example, in 3D printing using MJF, the 3D printing may result in a white powder stuck on the surface of the 3D printed object. Similarly, in the case of SLS printing, a semi-fused powder may be retained on the surface.

Figure 1:
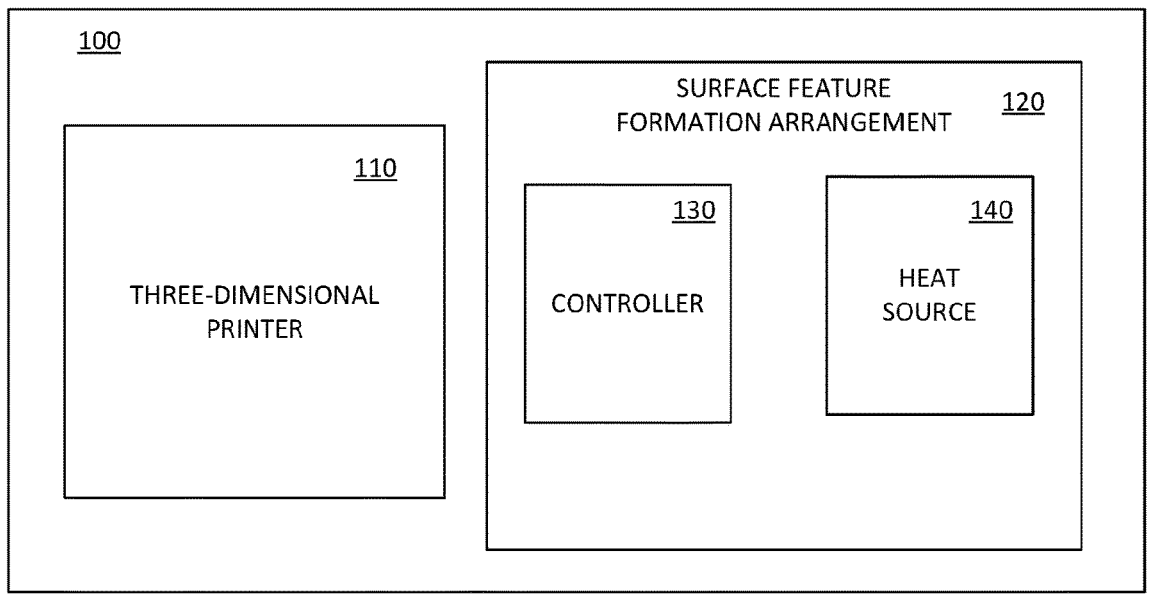
FIG. 1 illustrates an example system for surface feature formation for three-dimensional (3D) printed objects.

The example system 100 of FIG. 1 further includes a surface feature formation arrangement 120 to receive the 3D object printed by the 3D printer 110. The surface feature formation arrangement 120 of the example system 100 of FIG. 1 includes a controller 130 and a heat source 140. The controller 130 is to operate the heat source 140 to selectively apply heat to at least one surface of the 3D object. The heat from the heat source 140 is to transform the at least partly uncured build material to form a selected feature on the at least one surface.

In various examples, the heat source 140 may be a light projector to project ultraviolet, visible or infrared light. In one example, the heat source 140 is a light projector to project white light. The projected light from the light projector applies heat to selected portions of the surface of the 3D printed object. In various examples, the heat from the light source or other heat source transforms the at least partly uncured material by melting, evaporating, decomposing, consolidating, sintering, or coalescing the at least partly uncured material.

Figure 2:
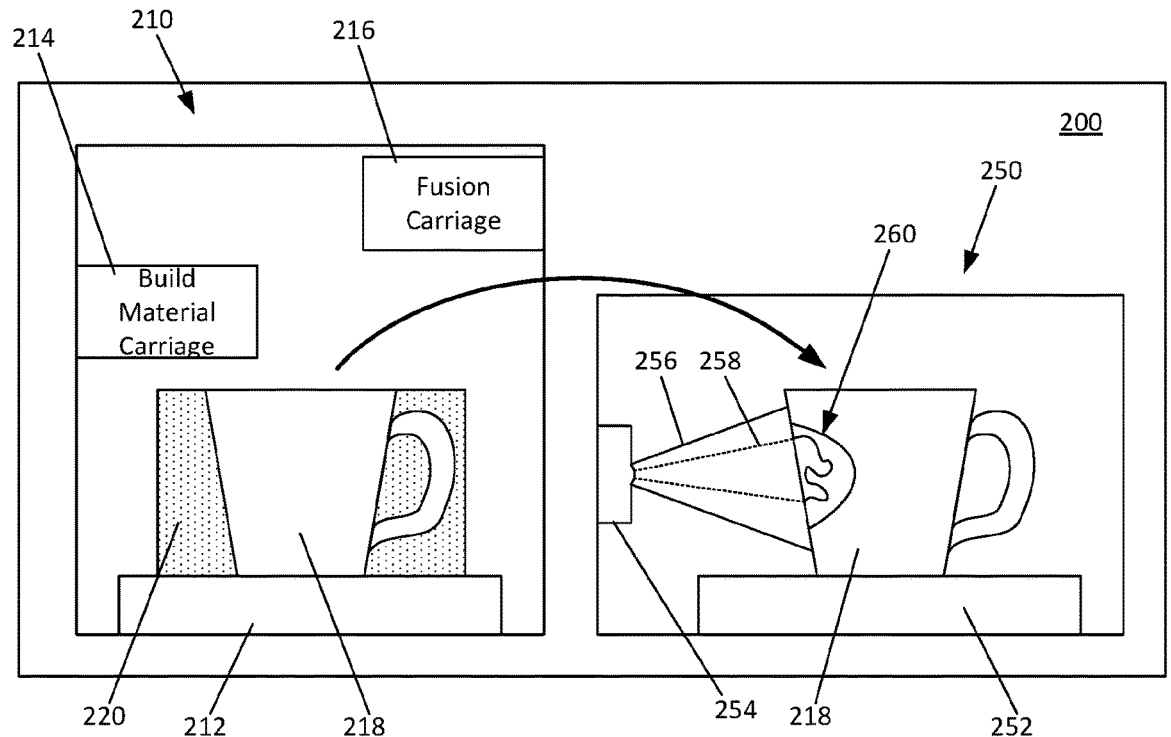
FIG. 2 illustrates another example system for surface feature formation for 3D printed objects.

Referring now to FIG. 2, another example system for surface feature formation for 3D printed objects is illustrated. The example system 200 of FIG. 2 includes a 3D printer 210 and a surface feature formation arrangement 250.

In various 3D printing systems, such as the 3D printer 210 of FIG. 2, a material such as a powder is deposited in layers, and each layer may be fused in selected areas to form a solid object. In this regard, the 3D printer 210 is provided with a platform 212 on which the depositing and fusing of the material may be performed. The size of the platform 212 may be different for various 3D printers. In the example system 200 of FIG. 2, a build material carriage 214 is provided to deposit a build material in successive layers. The build material may be stored in a reservoir or tank (not shown) that is coupled to the build material carriage 214. The 3D printer 210 of the example system 200 of FIG. 2 further includes a fusion carriage 216 that may fuse selected portions of each layer deposited by the build material carriage 214. In various examples, the fusion of the build material may be achieved by application of a laser (not shown) mounted on the fusion carriage. In other examples, the fusing may be achieved by application of energy or heat from other sources, such as a quartz infrared halogen lamp.

FIG. 2 illustrates an example object 218 formed of fused material surrounded by unfused material 220 remaining at each layer.

Once formed, the 3D object 218 may be transferred, directly or indirectly to the surface feature formation arrangement 250, as indicated by the large arrow in FIG. 2. In various examples, the 3D object 218 may be cleaned or finished prior to being transferred to the surface feature formation arrangement 250. For example, the 3D object 218 may be processed to remove the unfused material 220 in gaps or around the fused 3D object 218. Further, the 3D object 218 may be sandblasted prior to being transferred to the surface feature formation arrangement 250.

When transferred to the surface feature formation arrangement 250, the 3D printed object 218 is received by a 3D printed object receiving portion 252. In the example illustrated in FIG. 2, the 3D printed object receiving portion 252 is a platform. In other examples, the 3D printed object receiving portion 252 may include a harness to securely position the 3D printed object 218.

The surface feature formation arrangement 250 of the example system 200 is provided with a heat source 254. As noted above, the heat source 254 may be a light source, such as a projector. FIG. 2 illustrates the heat source 254 as a light projector which projects light within a field of projection 256. Projection of light by the heat source 254 onto the 3D printed object 218 causes a surface feature 260 to be formed on a surface of the 3D printed object 218. In various examples, the projector may project a pattern onto the surface of the 3D printed object 218 to transform the uncured material, as described below. The projected pattern may include any of a variety of images such as a logo, text, or an identifier.

In various examples, the light projector may project an image with light focused on selected portions of the surface of the 3D printed object 218, as indicated by the dashed lines 258 in FIG. 2. In some examples, the focusing of the light may be achieved through the use of a template positioned between the heat source 254 and the 3D printed object 218. In some examples, the projector may project the complete image to be formed. In other examples, particularly for projection onto a curved surface, the projector may project a sliver, or slice, of the image such that the light is focused at a normal to the surface of the 3D printed object 218. In this regard, the projected sliver of the image may be moved and changed in form as the 3D printed object 218 is rotated. The focusing of the light causes the embedded uncured material on the surface of the 3D printed object 218 to be transformed. For example, the heat projected onto the surface may cause the uncured material to be melted, evaporated, decomposed, consolidated, sintered, or coalesced. In this regard, the transformation of portions of the embedded uncured material may acquire a different appearance than the remaining portions. For example, the transformed portion of the surface may appear glossy relative to a matte appearance of the remainder of the surface.

In some examples, the 3D printed object 218 may be provided to the surface feature formation arrangement 250 in a heated, or warmed, condition. In this regard, the temperature of the surface of the 3D printed object 218 may be raised above ambient. In one example, the temperature of the surface of the 3D printed object 218 is a small amount below the heat deflection temperature, or the temperature at which the 3D printed object can start to deform, when the 3D printed object 218 is transferred to the surface feature formation arrangement 250. Thus, the thermal energy required from the heat source 254 to transform the embedded uncured material on the surface can be significantly reduced.

In some examples, the relative position of the heat source 254 and the 3D printed object 218 may be varied. For example, the heat source 254, the 3D printed object 218 or both may be movable to position the heat source 254 such that the heat (or light) is substantially normal to the surface of the 3D printed object 218. The heat source 254 may be mounted on a mechanism which allows it to be positioned and angled at a variety of positions to direct the light in a desired direction and location. In some examples, 3D printed object receiving portion 252 may be a harness which holds the 3D printed object 218 and allows the 3D printed object 218 to be moved or rotated to position desired portions of the surface of the 3D printed object 218 toward the heat source 256.

Figure 5:
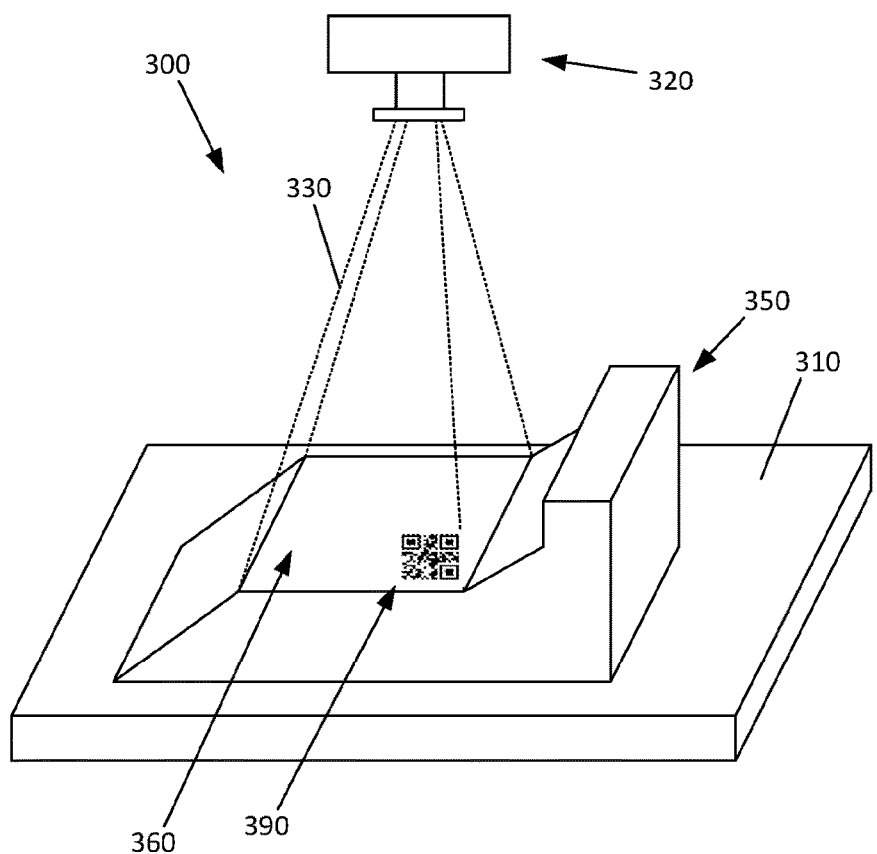
FIG. 5 illustrates another example surface feature formation arrangement.

Referring now to FIGS. 3-5, an example surface feature formation arrangement 300 is illustrated. The example arrangement 300 of FIG. 3 includes a 3D printed object receiving portion 310 and a light projector 320. As noted above, the 3D printed object receiving portion can support a 3D printed object 350 received, either directly or indirectly, from a 3D printer (not shown in FIG. 3). The 3D printed object 350 has at least one surface 360 with a layer of an embedded uncured material, resulting from the 3D printing process. The light projector 320 is provided to project light within a projection zone 330 to provide heat to selected portions of the surface 360. The light projector 320 projects a pattern onto the surface 360 of the 3D printed object 350 to transform the uncured material. As noted above, the transformation of the uncured material may include melting, evaporating, decomposing, consolidating, sintering, and/or coalescing of the uncured material, resulting in a visible distinction between the transformed portion of the surface 360 and the remainder of the surface 360.

In various examples, the pattern projected by the light projector 320 may include any of a variety of features to be formed on the surface 360 of the 3D printed object 350. For example, as illustrated in FIG. 3, the pattern projected by the light projector 320 may form a logo 370. The logo may include an image, text or any other 2-dimensional feature.

In various examples, the image formed by the light projector may include grayscale features. In this regard, various regions may be provided with more or less heat to vary the level of fusion of the uncured material. Varying levels of fusion can result in different visible properties.

In some examples, the properties of the projector may result in regions of high or low heat. For example, the light at the center of the projected image may be more intense than the outer portions. In this regard, the projected image may be used to compensate for this variation. For example, the projected image may be brighter on the periphery and dimmer at the center.

In various examples, the heat source 320 includes optical components which allow different portions of the image to be formed at different times. For example, the heat source 320 may be a projector with lenses, mirrors, or other optical components which allow light to be focused in different parts of the field of projection.

In another example, as illustrated in FIG. 4, the pattern projected by the light projector 320 may form at least one conductive trace 380 on the surface 360. In this regard, the embedded uncured material may include metal nanoparticles which melt or sinter to form the conductive trace 380. The metal nanoparticles may be added to 3D printed object 350 during forming of the 3D printed object 350 (e.g., during the 3D printing process). In this regard, the metal nanoparticles may be added at the regions of the 3D printed object 350 where the conductive trace 380 is to be formed. In one example, conductive traces 380 may form an RFID tag. In other examples, the conductive traces 380 may form traces to be used for an electronic circuit.

In yet another example, as illustrated in FIG. 5, the pattern projected by the light projector 320 may form an identifier 390, such as a quick-read (QR) code or any of a variety of other identifiers. For example, the identifier 390 may be a bar code, a 2-dimensional bar code, a serial number or any other such identifier. With the identifier 390 formed on the surface 360 of the 3D printed object 350, tracking of the 3D printed object 350 can be facilitated.

Of course, some examples may include any combination of surface features formed on the surface 380. For example, a 3D printed object may be provided with a logo, such as the logo 370 illustrated in FIG. 3, and an identifier, such as the identifier 390 illustrated in FIG. 5.

Figure 6:
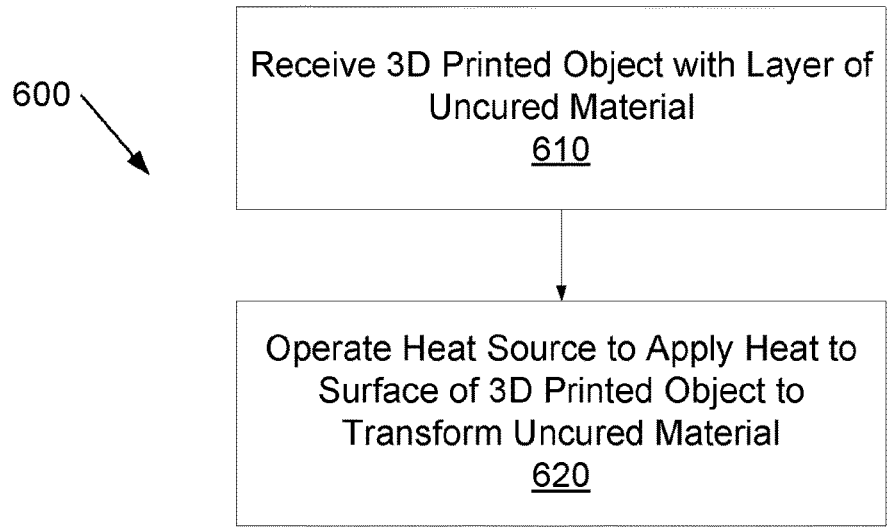
FIG. 6 is a flow chart illustrating an example method for surface feature formation for 3D printed objects.

Referring now to FIG. 6, a flow chart illustrating an example method for surface feature formation for 3D printed objects is provided. The example method 600 includes receiving a 3D printed object (block 610). As noted above, the 3D printing process causes a layer of at least partly uncured material to be embedded on a surface of the 3D printed object. The 3D printed object may be received on a platform or other receiving portion of a surface feature formation arrangement, such as the surface feature formation arrangement 300 described above with reference to FIGS. 3-5.

The example method 600 further includes operating a heat source to selectively apply heat to the at least one surface of the 3D object (block 620). The heat from the heat source transforms the at least partly uncured material to form a selected feature on a surface of the 3D printed object. As described above, the heat source may be a light projector which can project a pattern to selectively heat desired portions of the surface to form the desired feature. The feature may be a logo, text, identifier or conductive trace, for example.

Thus, the example systems described above provide an efficient manner of forming features on 3D printed objects. The example systems described herein take advantage of a characteristic of 3D printing (e.g., residual uncured material embedded on a surface). Further, a simple, low-cost heat source, such as a light projector may be used to form the desired surface feature.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
 a three-dimensional (3D) printer comprising a controller to control operation of components of the 3D printer, the components of the 3D printer configured to generate a 3D object, the 3D printer configured to form the 3D object having at least one surface with a layer of at least partly uncured material embedded on the surface; and
 a surface feature formation arrangement to receive the 3D object, the surface feature formation arrangement including:
  a controller; and
  a heat source,
 wherein the controller of the surface feature formation arrangement is to operate the heat source to selectively apply heat to the at least one surface of the 3D object, controller of the surface feature formation arrangement configured to operate the-heat source to transform the at least partly uncured material on the 3D object to form a selected feature from the at least partly uncured material on the at least one surface.

2. The system of claim 1, wherein the 3D printer is one of a multi-jet fusion (MJF) printer, a fused deposition modeling (FDM) printer, or a selective laser sintering (SLS) printer.

3. The system of claim 1, wherein the at least partly uncured material is one of a polymer powder or a metal nanoparticle ink.

4. The system of claim 1, wherein the heat source is a light source.

5. The system of claim 4, wherein the light source is to generate one of ultraviolet, visible or infrared light.

6. The system of claim 1, wherein the selected feature corresponds to an image projected by the heat source.

7. The system of claim 6, wherein the image includes at least one of a logo, text, or an identifier, or a part of at least one of a logo, text or an identifier.

8. The system of claim 1, wherein the at least partly uncured material is a metal nanoparticle ink and the selected feature is at least one conductive trace.

9. The system of claim 1, wherein the heat from the heat source is to transform the at least partly uncured material by one of melting, evaporating, decomposing, consolidating, sintering, or coalescing the at least partly uncured material.

10. A method of operating the system of claim 1, the method comprising:
 receiving a three-dimensional (3D) printed object, the 3D printed object having at least one surface with the layer of at least partly uncured material; and
 operating the heat source to selectively apply heat to the at least one surface of the 3D object, the heat from the heat source being to transform the at least partly uncured material to form the selected feature on the at least one surface.

11. The method of claim 10, wherein operating the heat source includes projecting an image or a pattern from the heat source onto the at least one surface.

12. The system of claim 1, wherein the surface feature formation arrangement further comprises:
 a three-dimensional (3D) printed object receiving portion to support the 3D object received from the 3D printer, the 3D printed object having at least one surface with the layer of at least partly uncured material embedded on the surface; and
 a light projector to project a pattern onto the surface of the 3D printed object to transform the at least partly uncured material.

13. The system of claim 12, further comprising a template positioned between the projector and the 3D printed object, wherein the template forms the pattern in light from the light projector passing through the template.

14. The system of claim 12, wherein the light of the pattern is brighter on a periphery of the pattern and dimmer at a center portion of the pattern.

15. The system of claim 12, wherein the light projector is to project light to heat the surface of the 3D object to transform the at least partly uncured material.

16. The system of claim 1, wherein the 3D printer is to embed the at least partly uncured material in a surface of the 3D object such that, when the 3D object is cleaned of uncured material, the at least partly uncured material remains on the surface of the 3D object.

17. The system of claim 1, wherein the heat from the heat source is to transform the at least partly uncured material by melting the at least partly uncured material.

18. The system of claim 1, wherein the heat source comprises an infrared projector to project a pattern corresponding to the selected feature using infrared energy.

19. The system of claim 1, wherein the surface feature formation arrangement comprises a harness or support to rotate the 3D object with respect to the heat source the heat source structured to project a sliver of an image corresponding to the selected feature, the image sliver being focused at a normal to a surface of the 3D object.

20. The system of claim 1, wherein the selected feature is a barcode, Quick-Read (QR) code or identification number.

* * * * *